United States Patent [19]

Godard

[11] 4,227,252
[45] Oct. 7, 1980

[54] METHOD AND DEVICE FOR ACQUIRING THE INITIAL PHASE OF THE CLOCK IN A SYNCHRONOUS DATA RECEIVER

[75] Inventor: Dominique N. Godard, Le Rouret, France

[73] Assignee: International Business Machines Corporation, Armonk, N.Y.

[21] Appl. No.: 8,917

[22] Filed: Feb. 2, 1979

[30] Foreign Application Priority Data

Feb. 28, 1978 [FR] France ................. 78 06562

[51] Int. Cl.³ .............................................. H04L 7/06
[52] U.S. Cl. .................................. 375/113; 375/118; 364/726
[58] Field of Search ................. 328/72, 75; 178/53, 178/69.1; 179/15 BS; 364/726, 111, 484, 485; 375/113, 118, 119

[56] References Cited

U.S. PATENT DOCUMENTS

| | | | |
|---|---|---|---|
| 3,395,391 | 7/1968 | Goroa et al. ...................... | 364/900 |
| 4,034,352 | 7/1977 | Hotchkiss ........................... | 364/900 |
| 4,084,251 | 4/1978 | Gills, Jr. ............................. | 364/726 |
| 4,092,723 | 5/1978 | Picquendar et al. .............. | 364/726 |

*Primary Examiner*—Benedict V. Safourek
*Attorney, Agent, or Firm*—John B. Frisone

[57] ABSTRACT

In a synchronous data transmission system wherein data transmission is achieved by modulating a carrier wave of frequency $f_c$ at the signaling rate $1/T$, a method for determining the initial phase value by which the phase of the receiver clock is to be varied during an initial synchronization operation during which a synchronization signal, the spectrum of which includes two distinct lines at frequencies $f_1 = f_c - \frac{1}{2}T$ and $f_2 = f_c + \frac{1}{2}T$, is transmitted comprising the steps of:
  (a) sampling the synchronization signal fed into the receiver at the rate $1/\tau$ which is a multiple of the signaling rate, to provide a signal $x(k\tau)$ where $k = a, 1, \ldots,$
  (b) multiplying the signal $X(\tau)$ by itself to provide a signal $s(k\tau)$.
  (c) computing the coefficient $C_o$, which corresponds to the frequency $1/T$, of the discrete Fourier transform of signal $s(k\tau)$ from N samples thereof, the number N being determined from the resolution $R = 1/N\tau$ required to overcome the effects of the frequency components, other than the component at frequency $1/T$, of signal $s(k\tau)$, and
  (d) computing the phase of coefficient $C_o$ that represents the initial phase value by which the phase of the receiver clock is to be varied.

7 Claims, 3 Drawing Figures

METHOD AND DEVICE FOR ACQUIRING THE INITIAL PHASE OF THE CLOCK IN A SYNCHRONOUS DATA RECEIVER

TECHNICAL FIELD

This invention relates to systems for synchronizing the clock in a synchronous data receiver and, more particularly, to a method and a device for acquiring the initial phase of the clock prior to the transmission of data.

BACKGROUND ART

In a synchronous digital data transmission system, the sequence of bits to be transmitted is first converted into a sequence of symbols. These symbols are then transmitted one at a time at instants called signaling instants, which have a T-second spacing and are determined by the transmitter clock. A carrier wave modulation technique is used wherein each symbol is caused to correspond to a discrete value of one or more characteristics (e.g., amplitude, phase) of the carrier wave. The modulated carrier wave is sent over the transmission channel. The modulated carrier is representative of the data at the signaling instants only, and it is essential, in order for the data to be correctly detected, that the receiver include an accurate clock indicating the signaling instants at which the signal received from the transmission channel is to be sampled. The phase and frequency of the receiver clock must be continuously adjusted, or synchronized, to optimize the sampling instants of the received data signal, and to compensate for phase and frequency variations between this clock and that of the transmitter. The synchronization of the receiver clock actually comprises three distinct operations.

A first synchronization operation which is performed before the first transmission of data takes place on a given day, for example, in the early morning. During this phase the transmitter provides a synchronization signal with which the receiver clock synchronizes. This operation may be relatively slow since it is performed only once a day.

A second transmitting synchronization operation which is carried out before each data message is transmitted. During this phase the receiver clock synchronizes with the synchronization signal provided by the transmitter. This operation must be very fast since the time required to achieve synchronization must be much shorter than that needed to transmit the actual data message if a satisfactory throughput is to be obtained.

A final operation is performed during the transmission of data for the purpose of maintaining synchronization. During this phase the receiver clock is continuously adjusted in accordance with a timing information derived from the received data signal.

This invention deals with the initial synchronization of the receiver clock. The invention is particularly well adapted to the requirements of the second synchronization operation defined above because it enables the various steps involved to be performed very quickly, but of course it can also be used for achieving the first synchronization operation.

In a data receiver, the pulses that define the sampling instants are provided by a clock pulse generator, or clock, the phase and frequency of which are adjusted by means of timing information supplied by a timing recovery device. Such devices may be regarded as falling within one of two main classes.

The first class includes those timing recovery devices in which timing information is obtained by filtering out a spectral line at the signaling frequency 1/T Hz or at some multiple of that frequency. This type of device is described, for example, in an article entitled, "Statistical Properties of Timing Jitter in a PAM Timing Recovery Scheme," by L. E. Franks and J. P. Bubrouski, in IEEE Transactions on Communications, Vol. COM-22, No. 7, July 1974, pp. 913–920. Briefly, in the timing recovery device described in said article, the signal received from the transmission channel, whether it is the synchronization signal supplied during any of the initial synchronization operations or the data signal being transmitted, is multiplied by itself and is then fed to a narrow-band filter centered at the signaling frequency. This filter provides a sine wave at the signaling frequency which is used as a timing wave with which the clock pulse generator synchronizes.

The timing recovery devices in this first class are very sensitive to noise. In addition, the narrow-band filters used in conjunction with digital techniques have a relatively long response time which is not conducive to achieving a fast initial synchronization. Accordingly, the use of said devices has been limited to repeaters and low-speed modems.

The second class includes those timing recovery devices in which the received signal is processed to obtain a control signal which is then used to adjust the phase and the frequency of a phase-locked oscillator acting as a clock pulse generator. Such a device is described, for example, in French Pat. No. 75 14020 filed by the present applicant Apr. 25, 1975 (publication No. 2,309,089). The device described in the patent includes first and second filters which are respectively used to extract from the received signal a first signal S1 of frequency $f_1 = f_c - \frac{1}{2}T$ and of phase $\phi_1$, and a second signal S2 of frequency $f_2 = f_c + \frac{1}{2}T$ and of phase $\phi_2$, where $f_c$ is the carrier frequency and 1/T is the signaling frequency, and means for combining these first and second signals to provide an error signal representative of the phase difference $\phi_2 - \phi_1$. The error signal is used to adjust the phase of a phase-locked oscillator. During an initial synchronization operation, signals S1 and S2 are extracted from the received synchronization signal and combined to obtain the value of the phase difference $\phi_2 - \phi_1$ which is used as an initial adjustment value of the phase of the phase-locked oscillator. The timing recovery device briefly described above enables the initial phase of the receiver clock to be fairly quickly obtained during an initial synchronization operation. For example, in the case of data transmitted at 4800 bits per second in accordance with CCITT Recommendation V27, the initial phase of the clock can be obtained within sixteen signaling periods, assuming that an unconditioned type of transmission channel is in use. In a multipoint data transmission system, it is essential that the initial synchronization operation be performed as quickly as possible; accordingly, this invention aims at providing means for achieving a still faster initial synchronization.

SUMMARY OF THE INVENTION

The invention contemplates a method for determining the initial value by which the phase of the receiver clock is to be varied during an initial synchronization operation during which a synchronization signal, the spectrum of which includes two distinct lines at frequencies $f_1 = f_c - \frac{1}{2}T$ and $f_2 = f_c + \frac{1}{2}T$, is transmitted and comprises the steps of:

(a) sampling the received signal at a rate $1/\tau$ which is a multiple of the signaling rate, to provide a signal $x(k\ \tau)$ where $k = 0, 1, \ldots$, (b) multiplying the signal $x(k\ \tau)$ by itself to provide a signal $s(k\ \tau)$, (c) computing the coefficient $C_o$, which corresponds to the frequency $1/T$, of the discrete Fourier transform of signal $s(k\ \tau)$ from N samples thereof, the number N being determined from the resolution $R = 1/N\tau$ required to overcome the effects of the components, other than the component at frequency $1/T$, of signal $s(k\ \tau)$, and (d) computing the phase of coefficient $C_o$ that represents the initial phase value by which the phase of the receiver clock is to be varied.

In accordance with another aspect of the invention, steps (c) and (d) set forth above may be replaced by the steps of:

(c') computing the real and imaginary parts of coefficient $C_o$, which corresponds to frequency $1/T$, of the discrete Fourier transform of signal $s(k\tau)$ from N samples thereof, the number N being determined from the resolution $R = 1N\tau$ required to overcome the effects of the components, other than the component at frequency $1/T$, of signal $s(k\tau)$, and (d') computing from the real and imaginary parts of coefficient $C_o$ the phase thereof that represents the initial phase value by which the phase of the receiver clock is to be varied.

It is, therefore, an object of this invention to provide a method and a device for acquiring the initial phase of the clock in a synchronous data receiver to assure a very fast initial synchronization of that clock prior to the transmission of data.

The foregoing and other objects, features and advantages of the invention will be apparent from the following more particular description of a preferred embodiment of the invention, as illustrated in the accompanying drawings.

DETAILED DESCRIPTION OF THE INVENTION

Figure 1:
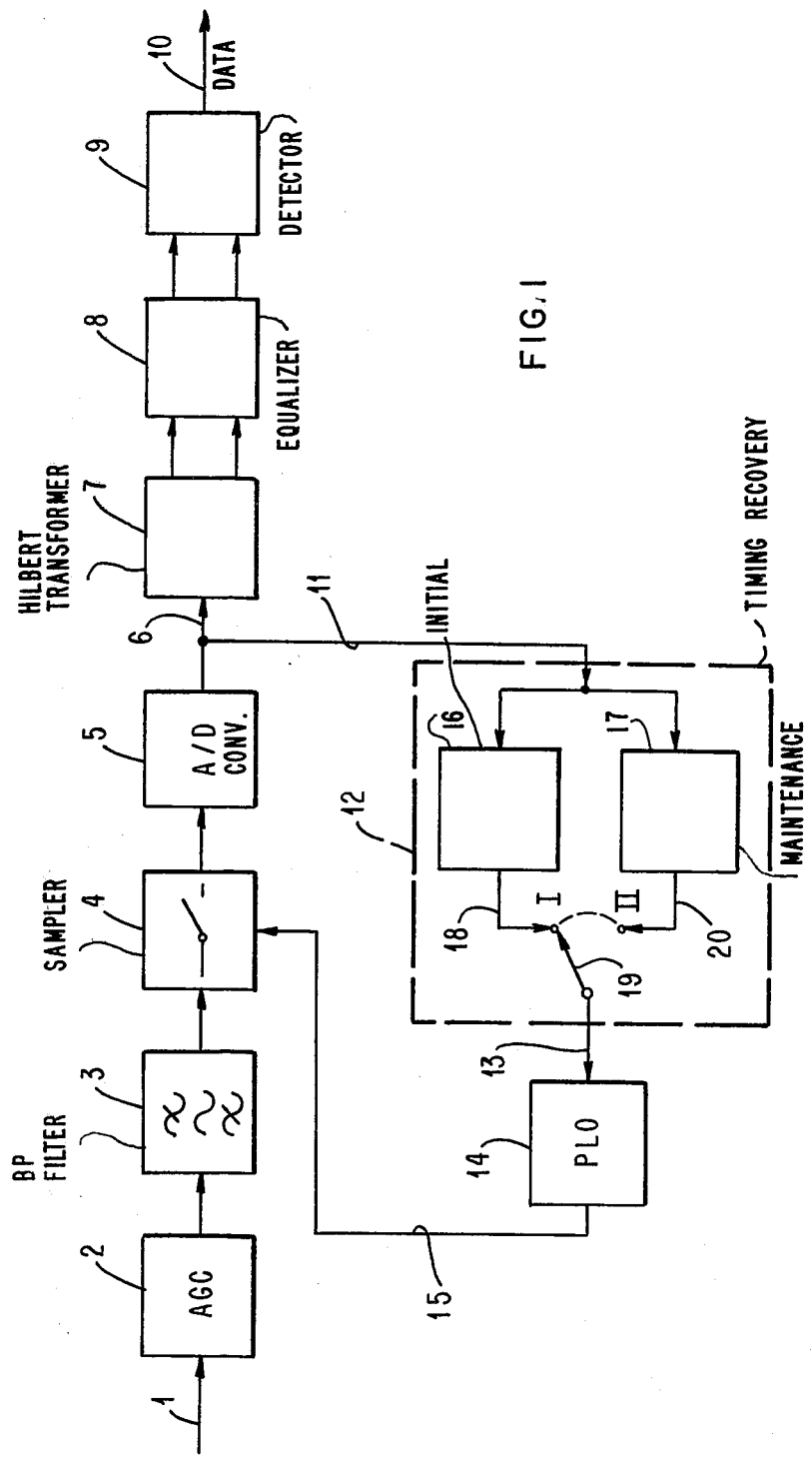
FIG. 1 is a block diagram of a synchronous data receiver incorporating the invention.

In order to illustrate the context within which the present invention finds application, a simplified block diagram of a synchronous data receiver according to the invention is shown in FIG. 1. By way of example, this block diagram illustrates the receiver in a synchronous data transmission system that uses double sideband-quadrature carrier (DSB-QC) modulation. The term DSB-QC modulation is used here in a broad sense and encompasses all systems wherein the transmitted signal can be represented by superimposing two amplitude modulated quadrature carriers. Thus, the term DSB-QC includes phase-shift keying (PSK) modulation, amplitude phase-shift keying (A-PSK) modulation, and quadrature amplitude (QAM) modulation.

The signal received from the transmission channel via line 1 is applied to the input of an automatic gain control (AGC) circuit 2 which normalizes the energy of the signal. The output from AGC circuit 2 is applied to the input of a band-pass filter 3 which rejects the out-of-band noise. The output from filter 3 is applied to the input of a sampling device 4 in which the received signal is sampled at the rate $1/\tau$ which is a multiple m/T of the signaling frequency $1/T$. The selected sampling rate $1/\tau$ exceeds the signaling frequency $1/T$ in order that a sufficient number of samples may be obtained to provide an adequate definition of the received signal. The value of the amplitude of the samples provided by device 4 is converted to digital form in an analog-to-digital (A/D) converter 5. The digital samples provided by A/D converter 5 are applied via line 6 to the input of a digital Hilbert transformer 7. A Hilbert transformer is a well-known device which supplies the in-phase and quadrature components of a signal applied thereto. An exemplary digital embodiment of such a device is discussed, for example, in an article entitled, "Theory and Implementation of the Discrete Hilbert Transform," by L. R. Robiner and C. M. Rader, in Digital Signal Processing, IEEE Press, 1972. Hilbert transformer 7 has two outputs which are respectively connected to the two inputs of a bandpass complex transversal equalizer 8. Such an equalizer is described, for example, in French Pat. No. 73 26404 filed by the present applicant on July 12, 1973 (publication No. 2,237,379). Equalizer 8 has two outputs respectively connected to the two inputs of a data detection system 9 which provides the detected data on its output line 10. Such a system is described, for example, in French Pat. No. 74 43560 filed by the present applicant Dec. 27, 1974 (publication No. 2,296,322).

The received signal samples provided by A/D converter 5 are also applied via a line 11 to the input of a timing recovery device 12. Device 12 generates on its output line 13 a control signal which is applied to the input of a digital phase-locked oscillator (PLO) 14. PLO oscillator 14 supplies clock pulses at the sampling rate to control sampling device 4 via a line 15 and the other previously described digital components of the receiver via lines not shown. PLO oscillator 14 is a well-known device which supplies pulses, the phase of which can be controlled, at a rate corresponding to the sampling frequency $1/\tau$. A digital PLO oscillator generally comprises a quartz oscillator that provides a high-frequency sine wave. This sine wave is converted into a square wave and applied to a chain of dividers which supplies pulses at the desired frequency. The phase of these pulses can be varied by varying the division ratios in the chain of dividers in accordance with the signal applied to the control input of the PLO oscillator.

The timing recovery device 12 includes the initial phase acquisition device 16 of the present invention and a device 17 that is used to maintain the synchronization. Device 16 has its input connected to input line 11 of device 12 and its output connected via a line 18 to position I of a two-position switch 19. Device 17 has its input connected to line 11 and its output connected via a line 20 to position II of switch 19. The common output of switch 19 is connected to the output line 13 of timing recovery device 12.

During each initial synchronization operation, switch 19 is set to position I and the phase of the pulses provided by PLO oscillator 14 is adjusted in accordance with the signal supplied by initial phase acquisition device 16. In normal operation, that is, during the transmission of data, switch 19 is set to position II and the phase of the pulses generated by PLO oscillator 14 is adjusted in accordance with the output signal from device 17. Initial phase acquisition device 16 will be described in detail with reference to FIG. 2. Many devices for maintaining synchronization are currently available. For example, device 17 may take the form of any one of the various devices described in the aforementioned French Pat. No. 75 14020 with reference to FIGS. 3, 6 and 7 thereof.

The initial phase acquisition device 16 of the present invention will now be described with reference to FIG. 2. The received signal samples provided by A/D converter 5 are applied via line 11 to the two inputs of a binary multiplier 21, the output of which is connected in parallel to a first input of two binary multipliers 22 and 23. The second inputs of these multipliers are respectively connected to the outputs of two six-stage shift registers (SR) 24 and 25. The output of each register is connected back to its input. The contents of these registers are simultaneously shifted at the sampling rate $1/\tau$. The outputs of multipliers 22 and 23 are respectively connected to the inputs of two accumulators (Acc.) 26 and 27 whose outputs are respectively connected to the two inputs of a digital resolver 28. A resolver is a well-known device which receives as inputs the values of the sine and cosine of an angle and supplies the value of that angle. A detailed description of a digital resolver will be found, for example, in French Pat. No. 71 47850 filed by the present applicant Dec. 21, 1971 (publication No. 21,164,544). Resolver 28 has its output connected to the control input of PLO oscillator 14 via line 18, switch 19 (when set to position I) and line 13 (FIG. 1). The operation of the device of FIG. 2 will now be described. In accordance with the invention, during an initial synchronization operation, a synchronization signal is transmitted whose spectrum includes two distinct lines at frequencies $$f_1 = f_c - \tfrac{1}{2}T$$

and $$f_2 = f_c + \tfrac{1}{2}T$$

where $f_c$ is the carrier frequency and T is the signaling period.

Such synchronization signals are well known. Reference may be made, for example, to the synchronization signal prescribed by CCITT Recommendation V27 which is obtained by causing the carrier to undergo continuous phase changes of 180° at the signaling rate; and to the synchronization signal prescribed by CCITT Recommendation V29 which results from continuous alternations between two signal elements at the signaling rate.

The signal fed into the receiver may be written as:

$$x(t) = A_1 \cos(2\pi f_1 t + \phi_1) + A_2 \cos(2\pi f_2 t + \phi_2) \quad (1)$$

where $A_1$ and $\phi_1$ are the amplitude and the phase of the component at frequency $f_1$ of the received signal, respectively, and $A_2$ and $\phi_2$ are the amplitude and the phase of the component at frequency $f_2$ of the received signal, respectively.

In accordance with the teachings of aforementioned French Pat. No. 75 14020, the phase of the receiver clock is correct when the phase difference $\phi_2 - \phi_1$ is zero. In the present invention, the phase difference $\phi_2 - \phi_1$ is used as the initial phase value by which the phase of the receiver clock must be varied to achieve a fast synchronization thereof.

Let $s(k\tau)$ be the received signal that is sampled and multiplied by itself $$s(k\tau) = x^2(k\tau) \quad (2)$$

According to (1), the signal $s(k\tau)$ may be written as $$\begin{aligned}
s(k\tau) =\ & \tfrac{1}{2}(A_1^2 + A_2^2) \\
& + \tfrac{1}{2} A_1^2 \cos[2\pi(2f_1)k\tau + 2\phi_1] \\
& + \tfrac{1}{2} A_2^2 \cos[2\pi(2f_2)k\tau + 2\phi_2] \\
& + A_1 A_2 \cos[2\pi(f_1 + f_2)k\tau + \phi_2 + \phi_1] \\
& + A_1 A_2 \cos[2\pi(f_2 - f_1)k\tau + \phi_2 - \phi_1]
\end{aligned} \quad (3)$$

According to (3), it may be seen that signal $s(k\tau)$ results from a superimposition of the following components:

a DC component of amplitude $\tfrac{1}{2}(A_1^2 + A_2^2)$, a component at frequency $2f_1$ of amplitude $\tfrac{1}{2} A_1^2$ and of phase $2\phi_1$, a component at frequency $2f_2$ of amplitude $\tfrac{1}{2} A_2^2$ and of phase $2\phi_2$, a component at frequency $f_1 + f_2$ of amplitude $A_1 A_2$ and of phase $\phi_1 + \phi_2$, and a component at frequency $f_2 - f_1 = 1/T$ of amplitude $A_1 A_2$ and of phase $\phi_2 - \phi_1$.

Figure 3:
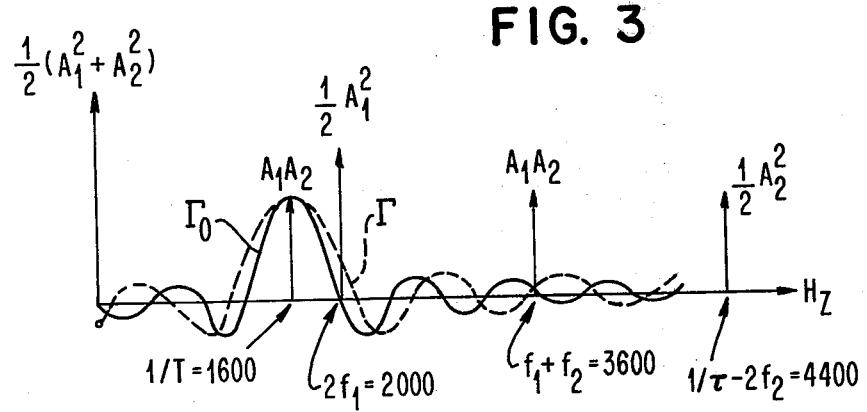
FIG. 3 shows the spectrum of the synchronization signal multiplied by itself.

Thus, the spectrum of signal $s(k\tau)$ is the spectrum of lines shown in FIG. 3 where $f_1 = 1000$ Hz, $f_2 = 2600$ Hz, $f_c = 1800$ Hz, $1/T = 1600$ Hz and $1/\tau = 6/T$, all of which corresponds to a data transmission carried out at 4800 bits per second in accordance with CCITT Recommendation V27.

It should be noted that, after sampling at $1/\tau = 9600$ Hz, the spectrum becomes periodic and exhibits a period $1/\tau$. The component at $2f_2$ (over 4800 Hz, in this example) is converted, because of the sampling, into a component at $1/\tau - 2f_2 = 4400$ Hz.

The phase difference $\phi_2 - \phi_1$ is the phase of the component at $1/T$ of signal $s(k\tau)$, and it is the object of this invention to determine the latter phase as quickly as possible.

In accordance with the invention, the phase of the component at $1/T$ of signal $s(k\tau)$ is determined by computing from a predetermined number N of samples of said signal the coefficient $C_o$ that corresponds to frequency $1/T$ of the Discrete Fourier Transform (DFT) of $s(k\tau)$, then by computing the phase of that coefficient. The fact that N samples of signal $s(k\tau)$ are taken for the purpose of computing the DFT thereof means that the signal is examined during a rectangular time window of duration $N\tau$. Theoretically, this means that the DFT of $s(k\tau)$ does not provide the spectrum of that signal, but that of signal $s(k\tau)$ as modulated by a rectangular time window of amplitude equal to unity and of duration $N\tau$. Coefficient $C_o$ of the DFT of $s(k\tau)$ provides the convolution of the spectrum of signal $s(k\tau)$ with the Fourier transform centered at frequency $1/T$ Hz of the time window. The Fourier transform of that window is a conventional curve of the type sin x/x represented in FIG. 3 by curve $\Gamma$ corresponding to an arbitrary number N of samples. In order for the phase of coefficient $C_o$ to provide an exact measurement of the phase of the component at 1/T, it is necessary that the product of the spectrum of lines and curve $\Gamma$ yield the spectral line at 1/T. Since the spectrum includes components at frequencies 0, $2f_1$, $f_1+f_2$, and $1/\tau-2f_2$, and since there are no zero crossings of curve $\Gamma$ at these frequencies, the product of the spectrum of lines and curve $\Gamma$ will provide not only the spectral line at 1/T, but also part of the lines at frequencies 0, $2f_1$, $1/\tau-2f_2$, and $f_1+f_2$. Thus, in the case of an arbitrary number N of samples, the phase of coefficient $C_o$ will fail to provide an exact measurement of the phase of the component at 1/T. In accordance with the invention, a number N of samples is selected such that curve $\Gamma$ will have a zero crossing at least at frequency $2f_1$ which affects more significantly the computation of coefficient $C_o$ in the example shown in FIG. 3 where there is a difference of only 400 Hz between frequencies $2f_1$ and 1/T. The relationship between the number of samples and the zero crossings of curve $\Gamma$ is written as $$R = 1/N\tau \qquad (4)$$

where R is the resolution expressed in Hz. Curve $\Gamma$ has a zero crossing every R Hz about frequency 1/T. FIG. 3 illustrates a curve $\Gamma_o$ determined in accordance with the invention and corresponding to a resolution R=400 Hz and to a number of samples N=24. Curve $\Gamma_o$ has zero crossings at frequencies $2f_1$, $f_1+f_2$, and $1/\tau-2f_2$.

Referring again to FIG. 2, the sampled input signal $x(k\tau)$ is multiplied by itself in multiplier 21, which provides signal $s(k\tau)$. Signal $s(k\tau)$ is applied to a device for computing the coefficient $C_o$ of the DFT of $s(k\tau)$. In the preferred embodiment shown in FIG. 2 by way of example, this device includes multipliers 22 and 23, shift registers 24 and 25, and accumulators 26 and 27.

Coefficient $C_o$ of the DFT of signal $s(k\tau)$ is given by the well-known relation $$C_o = \sum_{k=o}^{N-1} s(k\tau) e^{-j\frac{2\pi}{T}k\tau} \qquad (5)$$

Coefficient $C_o$ is a complex number and relation (5) can be split up in order to obtain the real part of $C_o$, Re $C_o$, and its imaginary part, Im $C_o$:

$$Re\ C_o = \sum_{k=o}^{N-1} s(k\tau) \cos \frac{2\pi}{T} k\tau \qquad (6)$$

$$Im\ C_o = - \sum_{k=o}^{N-1} s(k\tau) \sin \frac{2\pi}{T} k\tau \qquad (7)$$

If, for example, $\tau = T/6$ and N=24, which are the values used in the example shown in FIG. 3, relations (6) and (7) respectively become:

$$Re\ C_o = \sum_{k=o}^{23} s(k\tau) \cos \frac{k\pi}{3} \qquad (8)$$

$$Im\ C_o = - \sum_{k=o}^{23} s(k\tau) \sin \frac{k\pi}{3} \qquad (9)$$

Figure 2:
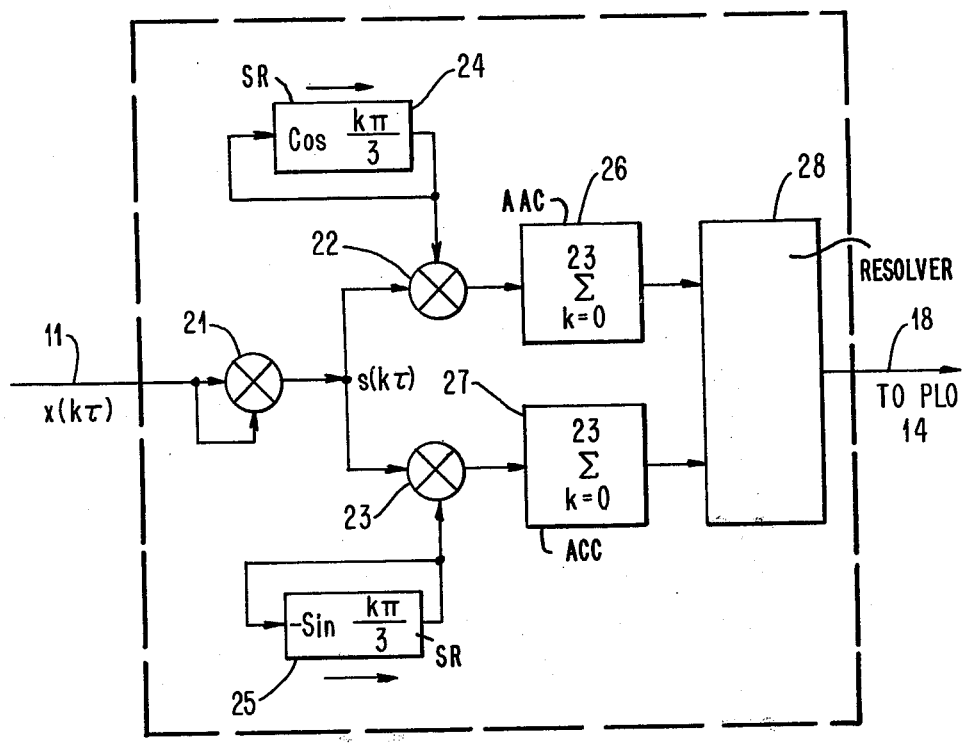
FIG. 2 is a block diagram of an initial phase acquisition device in accordance with the invention.

The device illustrated in FIG. 2 uses relations (8) and (9) to compute Re $C_o$ and Im $C_o$. Signal $s(k\tau)$ is applied in parallel to the input of two paths; namely, a path termed "real path" which includes multiplier 22, shift register 24 and accumulator 26 and computes Re $C_o$ according to (8), and a path termed "imaginary path" which includes multiplier 23, shift register 25 and accumulator 27 and computes Im $C_o$ according to (9). Both paths have an identical configuration and those skilled in the art will understand that a single path could serve to compute Re $C_o$ and Im $C_o$ in succession if sufficiently fast components were used.

The real path computes Re $C_o$ as follows. The signal $s(k\tau)$ is applied to a first input of multiplier 22, the second input of which receives the values of cos $k(\pi/3)$ for k=0, 1, ..., 23 stored in shift register 24. Since the function cos $k\pi/3$ can take on six distinct values as k varies, shift register 24 is provided with six stages to enable these six values to be stored.

The content of register 24 is shifted at the sampling rate $1/\tau$. The products $$s(k\tau) \cos (k\pi/3) \quad for\ k=0, ..., 23$$

are successively obtained at the output of multiplier 22.

These products are accumulated in accumulator 26 which provides the real part of $C_o$ after 24 sampling periods:

$$Re\ C_o = \sum_{k=o}^{23} s(k\tau) \cos \frac{k\pi}{3}.$$

Similarly, the imaginary path enables Im $C_o$ to be computed in accordance with relation (9). It can readily be verified that the values of Re $C_o$ and Im $C_o$ respectively defined by relations (8) and (9) are respectively equal to $$Re\ C_o = 12\ A_1 A_2 \cos(\phi_2 - \phi_1)$$

$$Im\ C_o = 12\ A_1 A_2 \sin(\phi_2 - \phi_1)$$

The quantities Re $C_o$ and Im $C_o$ respectively provided by accumulators 26 and 27 after 24 sampling periods are applied to the inputs of resolver 28 which derives therefrom the value of phase $\phi_2 - \phi_1$ of the component at 1/T which is applied via line 13 to the control input of PLO oscillator 14. The value of $\phi_2 - \phi_1$ is the initial phase value by which the phase of PLO oscillator 14 must be varied.

Assuming again by way of example that data are transmitted at 4800 bps in accordance with CCITT Recommendation V27 at a signaling rate 1/T=1600 Hz and that one selects $1/\tau = 6/T$, it will be found that an exact measurement of the initial phase value is obtained after 24 samples, that is, after four signaling periods or 2.5 ms only.

While the invention has been particularly shown and described with reference to a preferred embodiment thereof, it will be understood by those skilled in the art that numerous changes in form and detail may be made therein without departing from the spirit and scope of the invention.

Having thus described my invention, what I claim as new, and desire to secure by Letters Patent is:

1. In a synchronous data transmission system wherein the data are transmitted by modulating a carrier wave $f_c$ at a signaling rate 1/T, a method of determining the initial phase value by which the phase of the receiver clock must be varied during an initial synchronization signal whose spectrum includes two distinct lines at frequencies $f_1 = f_c - \frac{1}{2}T$ and $f_2 = f_c + \frac{1}{2}T$ is transmitted, said method being characterized in that it includes the steps of:

(a) sampling the synchronization signal received at the input of the receiver at a rate $1/\tau$ which is a multiple of the signaling rate, to obtain a signal $x(k\tau)$ where $k=0, 1, \ldots,$ (b) multiplying signal $x(k\tau)$ by itself to obtain a signal $s(k\tau)$, (c) computing the complex coefficient $C_o$, which corresponds to the frequency $1/T$, of the discrete Fourier transform of signal $s(k\tau)$ from a number N of samples thereof, in accordance with the following relation:

$$C_o = \sum_{k=0}^{N-1} s(k\tau) e^{-j\frac{2\pi}{T}k\tau}$$

said number N being given by $N = 1/R\tau$ where R is the resolution expressed in $H_z$ and is equal to the difference between $2f_1$ and $1/T$, and (d) computing the phase of complex coefficient $C_o$, which represents the initial phase value by which the phase of the receiver clock must be varied.

2. In a synchronous data transmission system wherein the data are transmitted by modulating a carrier wave $f_c$ at a signaling rate $1/T$, a method of determining the initial phase value by which the phase of the receiver clock must be varied during an initial synchronization operation during which a synchronization signal whose spectrum includes two distinct lines at frequencies $f_1 = f_c - \frac{1}{2}T$ and $f_2 = f_c + \frac{1}{2}T$ is transmitted, said method being characterized in that it includes the steps of:

(a) sampling the synchronization signal received at the input of the receiver at a rate $1/\tau$ which is a multiple of the signaling rate, to obtain a signal $x(k\tau)$ there $k=0, 1, \ldots,$ (b) multiplying signal $x(k\tau)$ by itself to obtain a signal $s(k\tau)$, (c) computing the real, Re $C_o$, and imaginary, Im $C_o$, parts of complex coefficient $C_o$, which corresponds to frequency $1/T$, of the discrete Fourier transform of signal $s(k\tau)$ from N samples thereof, in accordance with the following relations:

$$Re\ C_o = \sum_{k=o}^{N-1} s(k) \cos \frac{2\pi}{T} k\tau$$

$$Im\ C_o = \sum_{k=o}^{N-1} s(k\tau) \sin \frac{2\pi}{T} k\tau$$

said number N being given by $N = 1/R\tau$ where R is the resolution expressed in $H_z$ and is equal to the difference between $2f_1$ and $1/T$, and (d) computing from the real and imaginary parts of complex coefficient $C_o$ the phase thereof that represents the initial phase value by which the phase of the receiver clock is to be varied.

3. In a synchronous data transmission system wherein the data are transmitted by modulating a carrier wave of frequency $f_c$ at a signaling rate $1/T$, a device for determining the initial phase value by which the phase of the receiver clock must be varied during an initial synchronization operation during which a synchronization signal whose spectrum includes two distinct lines at frequencies $f_1 = f_c - \frac{1}{2}T$ and $f_2 = f_c + \frac{1}{2}T$ is transmitted, said device being characterized in that it includes:

sampling means for sampling the signal received at the input of the receiver at a rate $1/\tau$ which is a multiple of the signaling rate, thereby providing a signal $x(k\tau)$ where $k=0, 1, \ldots,$ first multiplier means for multiplying signal $x(k\tau)$ by itself, thereby providing a signal $s(k\tau)$, first computing means for computing from said signal $s(k\tau)$ the complex coefficient $C_o$, which corresponds to frequency $1/T$, of the discrete Fourier transform of signal $s(k\tau)$ from a number N of samples of said signal, in accordance with the following relation:

$$C_o = \sum_{k=o}^{N-1} s(k\tau) e^{-j\frac{2\pi}{T}k\tau}$$

said number N being given by $N = 1/R\tau$ where R is the resolution expressed in $H_z$ and is equal to the difference between $2f_1$ and $1/T$ and, second computing means for computing the phase of complex coefficient $C_o$ which represents the initial phase value by which the phase of the receiver clock must be varied.

4. A device according to claim 3, characterized in that the means for computing complex coefficient $C_o$ includes:

first means for computing from said signal $s(k\tau)$ the real part of coefficient $C_o$, Re $C_o$, in accordance with the following relation:

$$Re\ C_o = \sum_{k=o}^{N-1} s(k\tau) \cos \frac{2\pi}{T} k\tau$$

and, second means for computing from said signal $s(k\tau)$ the imaginary part of complex coefficient $C_o$, Im $C_o$, in accordance with the following relation:

$$Im\ C_o = -\sum_{k=o}^{N-1} s(k\tau) \sin \frac{2\pi}{T} k\tau$$

5. A device according to claim 4, characterized in that said first means for computing the real part of complex coefficient $C_o$ includes:

storage means in which the precomputed values of $\cos (2\pi/T) k\tau$ for $k=0, 1, \ldots, (N-1)$, are stored, second multiplier means for multiplying said signal $s(k\tau)$ by said precomputed values, thereby providing the products $s(k\tau) \cos (2\pi/T) k\tau$ for $k=0, 1, \ldots, (N-1)$ and an accumulator having its input connected to the output of said second multiplier means for accumulating said products successively provided by said second multiplier means, said accumulator containing the value of the real part of complex coefficient $C_o$ after all of said products have been accumulated.

6. A device according to claim 4, characterized in that said second means for computing the imaginary part of complex coefficient $C_o$ includes:

storage means in which the precomputed values of $-\sin (2\pi/T) k\tau$ for $k=0, 1, \ldots, (N-1)$, are stored,, second multiplier for multiplying said signal s(kτ) by said precomputed values, thereby providing the products −s(kτ) sin (2π/T) kτ for k=0, 1, ..., (N−1), and an accumulator having its input connected to the output of said second multiplier means for accumulating said products successively provided by said second multiplier means, said accumulator containing the value of the imaginary part of complex coefficient $C_o$ after all of said products have been accumulated.

7. In a synchronous data transmission system wherein the data are transmitted by modulating a carrier wave of frequency $f_c$ at a signaling rate 1/T, a device for determining the initial phase value by which the phase of the receiver clock must be varied during an initial synchronization operation during which a synchronization signal whose spectrum includes two distinct lines at frequencies $f_1 = f_c − \frac{1}{2}T$ and $f_2 = f_c + \frac{1}{2}T$ is transmitted, said device being characterized in that it includes:

sampling means for sampling the received signal at a rate 1/τ which is a multiple of the signaling rate, thereby providing a signal x(kτ), first multiplier means for multiplying said signal x(kτ) by itself, thereby providing a signal s(kτ), first storage means in which the precomputed values of cos (2π/T) kτ for k=0, 1, ..., (N−1) are stored, where N is given by $$N = 1/R\tau$$

where R is the resolution expressed in $H_z$ and is equal to the difference between $2f_1$ and 1/T, second multiplier means for multiplying said signal s(kτ) by said precomputed values stored in said first storage means, thereby providing the products s(kτ) cos (2π/T) kτ for k=0, 1, ..., (N−1), first accumulator means having its input connected to the output of said second multiplier means for accumulating the products successively provided by said second multiplier means, said accumulator containing the value of the real part of complex coefficient $C_o$ after all of the products have been accumulated, second storage means in which the precomputed values of −sin (2π/T) kτ for k−0, 1, ..., (N−1) are stored, third multiplier means for multiplying said signal s(kτ) by said precomputed values stored in said second storage means, thereby providing the products −s(kτ) sin (2π/T) kτ for k=0, 1, ..., (N−1), second accumulator means having its input connected to the output of said third multiplier means for accumulating the products successively provided by said third multiplier means, said accumulator containing the value of the imaginary part of complex coefficient $C_o$ after all of the products have been accumulated, and a resolver for deriving the value of the phase of coefficient $C_o$ from the real and imaginary parts thereof, the value of said phase representing the initial phase value by which the phase of the receiver clock must be varied.

* * * * *